US 8,195,781 B2

(12) United States Patent
Cowham

(10) Patent No.: US 8,195,781 B2
(45) Date of Patent: Jun. 5, 2012

(54) NETWORK MANAGEMENT WITH SCALABLE TRAP DEFINITIONS

(75) Inventor: Adrian Walter Cowham, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1765 days.

(21) Appl. No.: 10/923,235

(22) Filed: Aug. 19, 2004

(65) Prior Publication Data

US 2006/0041652 A1    Feb. 23, 2006

(51) Int. Cl.
*G06F 15/173*    (2006.01)
(52) U.S. Cl. ...................................................... 709/223
(58) Field of Classification Search .................. 709/224; 719/310; 726/22; 715/734; 370/486
See application file for complete search history.

(56) References Cited

U.S. PATENT DOCUMENTS

| 5,999,179 A * | 12/1999 | Kekic et al. .................... 715/734 |
| 6,272,150 B1 * | 8/2001 | Hrastar et al. ................. 370/486 |
| 6,292,472 B1 | 9/2001 | Rariden et al. |
| 6,671,254 B1 | 12/2003 | Nakahira |
| 2004/0006619 A1 * | 1/2004 | Syed et al. .................... 709/224 |
| 2005/0039188 A1 * | 2/2005 | Agashe ......................... 719/310 |
| 2005/0204343 A1 * | 9/2005 | Kisamore et al. ............. 717/124 |
| 2005/0204404 A1 * | 9/2005 | Hrabik et al. ................... 726/22 |
| 2007/0234341 A1 * | 10/2007 | Chang et al. .................. 717/173 |

* cited by examiner

*Primary Examiner* — Jerry Dennison

(57) ABSTRACT

One embodiment disclosed relates to a process of configuring a network management system to support a new event trap. A new trap definition file is created which corresponds to the event trap. The new trap definition file is dropped into a trap definitions folder that is known to the network management system. Another embodiment disclosed relates to a method of processing an event trap by network management software. The trap is received, and a determination is made as to the trap code of the trap. Trap definition files in a trap definitions folder are scanned for a corresponding trap definition file having the trap code. Other embodiments are also disclosed.

20 Claims, 6 Drawing Sheets

NETWORK MANAGEMENT WITH SCALABLE TRAP DEFINITIONS

BACKGROUND OF THE INVENTION

1. Field of the Invention

The present invention relates generally to computer networking and computer software. More particularly, the present invention relates to network management systems.

2. Description of the Background Art

Simple network management protocol (SNMP) is a protocol that is used to exchange management-related information between network devices. Different versions of SNMP exist.

FIG. 1 is a schematic diagram depicting a conventional SNMP managed network 100. The network includes a network management system (NMS) 102 and SNMP agents 104 interconnected by way of an Internet Protocol (IP) network 101. The NMS 102 resides on one or more management stations 106, and the SNMP agents 104 reside in managed devices 108. The managed devices 108 may include, for example, computer hosts, servers, printers, bridges, hubs, switches, or other network elements.

The management station 106 includes a management information base (MIB) 110. The MIB 110 includes information about the properties of managed resources and the services supported by the agents 104. Among other information, the MIB 110 includes a global trap definition file 112. The managed devices 108 may each include a management subsystem 114

A trap is an SNMP command that is used to report events from an agent 104 to the NMS 102. Among other objects and information, the MIB 110 includes definitions of event traps. Each trap has associated a specific trap code to identify the trap event.

FIG. 2 is a flow chart depicting a conventional method 200 of providing support for new traps in an SNMP system. A new trap comprises a newly defined type of network-management-related event. For example, the new trap may be an alert to the NMS regarding a type of equipment error, or regarding a type of security breach, or various other types of events.

For example, a network product (such as a switch or other device) may be developed with a feature so as to support 202 a new SNMP trap. However, the network management software does not know 204 how to process the new trap because the global definition file 112 does not include a definition for the new trap.

In order to support the new trap, a user with privilege to modify the global definition file 112 (such as, for example, a software engineer of a system provider) accesses 206 the global definition file 112. The user then modifies 208 the source code of the global definition file 112 so that it includes instructions as to processing the new trap. This new global definition file may then be released 210 to customers, and a customer may replace 212 the previously-used global definition file with the new global definition file. Thereafter, the customer's network management software (at the managed devices and the NMS) processes 214 the new trap using the new global definition file.

It is highly desirable to improve networking and network management systems. In particular, it is desirable to improve the conventional technique for supporting new event traps in network management systems.

SUMMARY

One embodiment of the invention pertains to a process of configuring a network management system to support a new event trap. A new trap definition file is created which corresponds to the event trap. The new trap definition file is dropped into a trap definitions folder that is known to the network management system.

Another embodiment pertains to a system of processing an event trap by network management software. A network management system (NMS) is configured to receive the trap. Software code of the NMS is configured to determine a trap code of the trap. Additionally, software code of the NMS is configured to scan trap definition files in a trap definitions folder for a corresponding trap definition file having the trap code.

Another embodiment pertains to a method of processing an event trap by network management software. The trap is received, and a determination is made as to the trap code of the trap. Trap definition files in a trap definitions folder are scanned for a corresponding trap definition file having the trap code.

Another embodiment pertains to a management station of a network management system. The management station includes a network management system and a management information base utilized by the network management system. The management station also includes a trap definitions folder having a plurality of trap definition files therein. The network management system is configured such that, when a trap is received, the multiple trap definition files in the folder are scanned in order to find a file corresponding to the received trap.

DETAILED DESCRIPTION

Figure 3A:
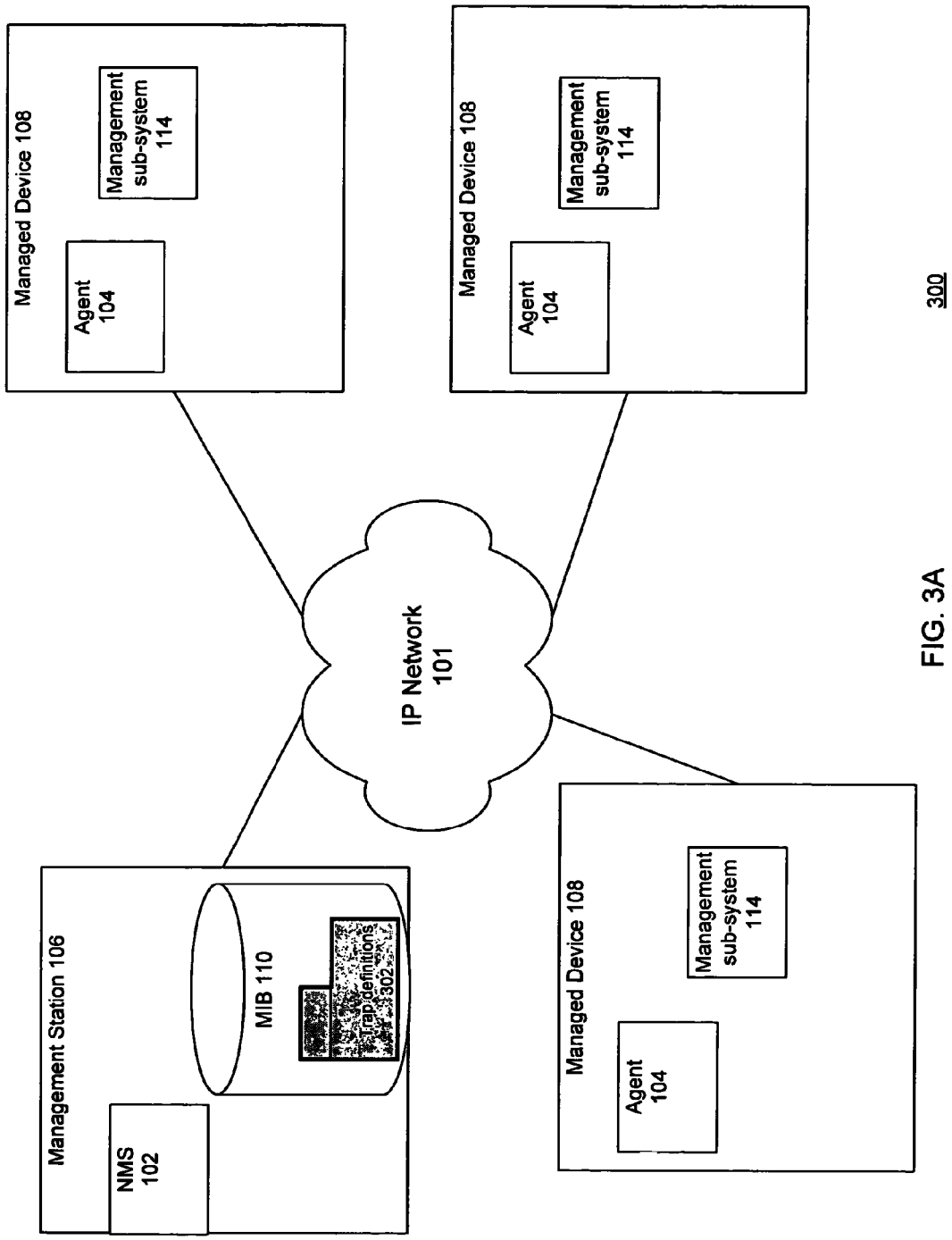
FIGS. 3A and 3B are schematic diagrams depicting an SNMP managed network in accordance with an embodiment of the invention.
Figure 3B:
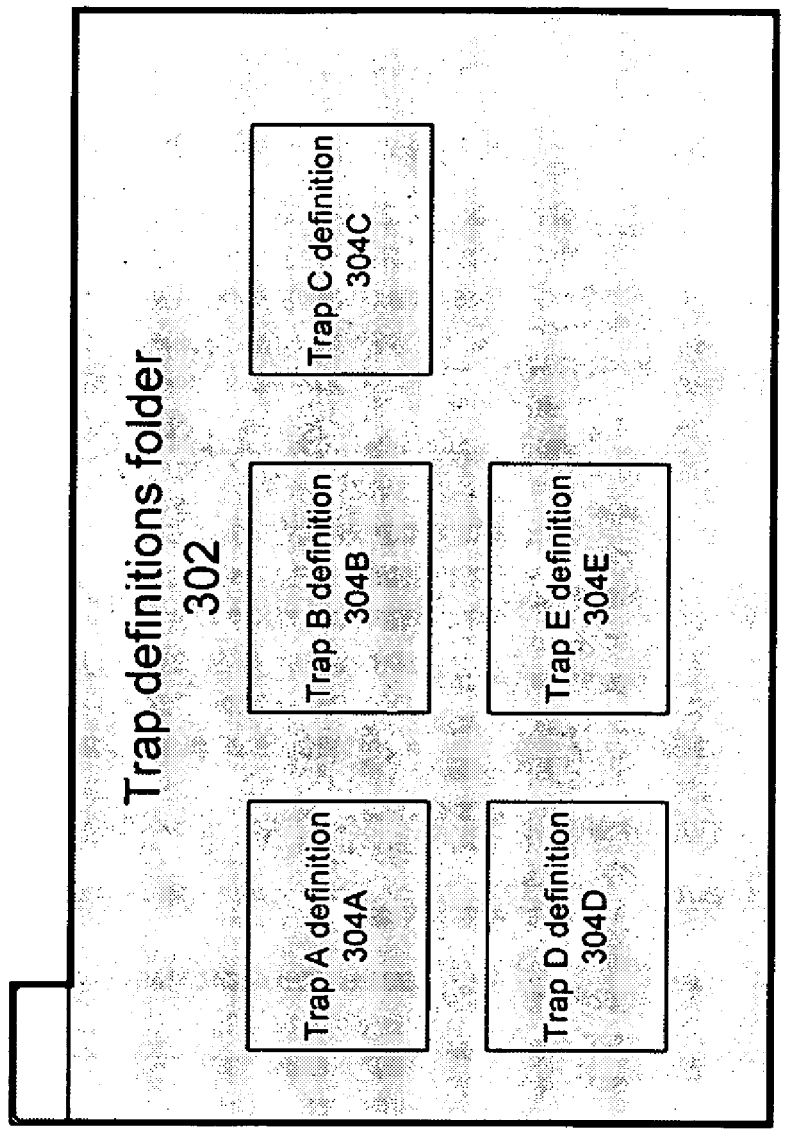

FIGS. 3A and 3B are schematic diagrams depicting an SNMP managed network 300 in accordance with an embodiment of the invention. As shown in FIG. 3A, the MIB 110 does not include a global trap definition file 112. Instead, a trap definitions folder 302 is used. As shown in FIG. 3B, the trap definitions folder 302 advantageously includes a plurality of specific trap definition files 304. Each trap definition file 304 in the folder 302 provides information relating to a specific trap event. The NMS 102 software is modified such that it looks up trap definitions by searching over the specific trap definition files 304 in the trap definition folder 302.

Figure 4:
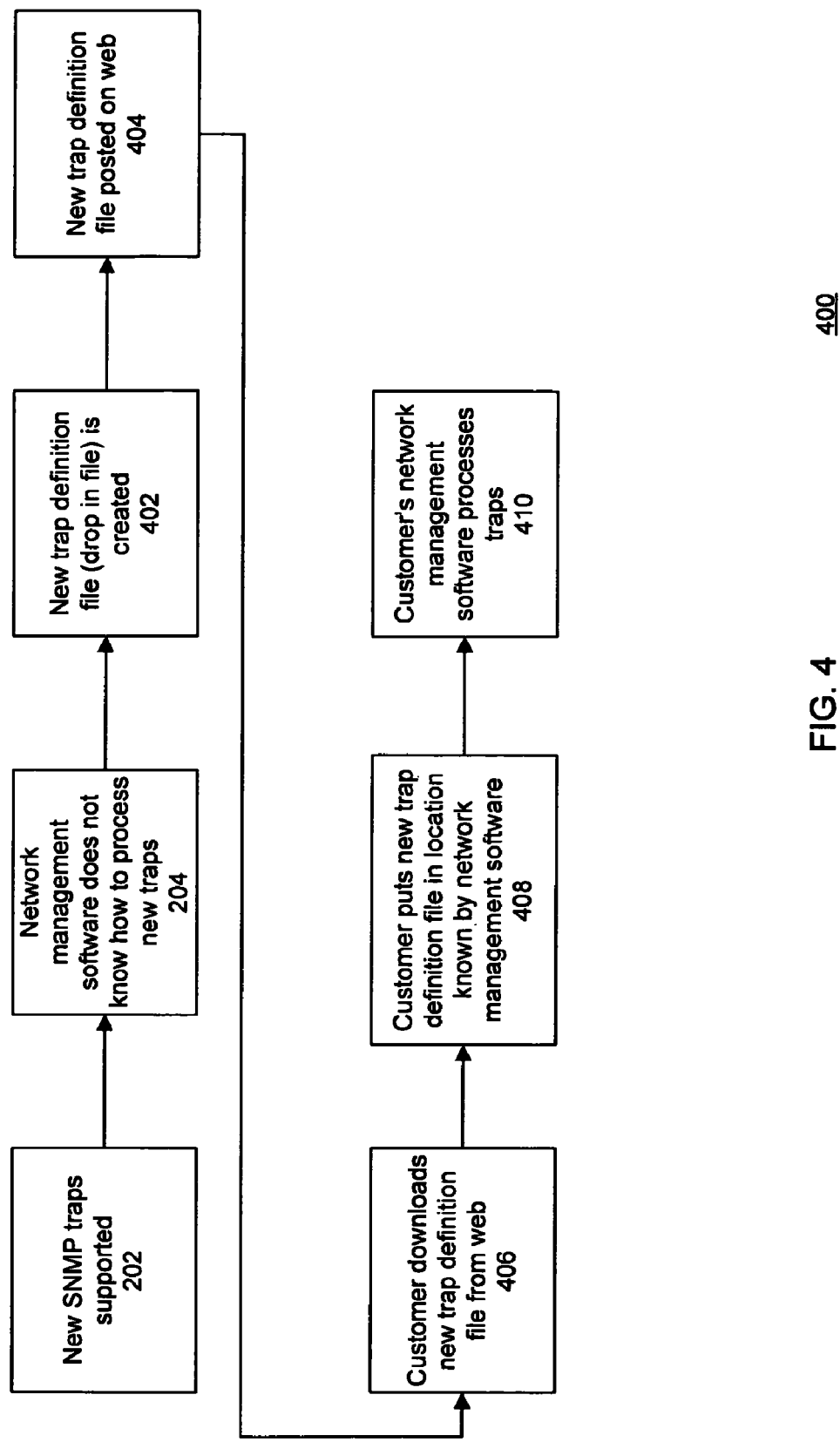
FIG. 4 is a flow chart depicting a method of supporting new traps in an SNMP system in accordance with an embodiment of the invention.

FIG. 4 is a flow chart depicting a method 400 of supporting new traps in an SNMP system in accordance with an embodiment of the invention. Like the conventional method 200 of FIG. 2, a network product (such as a switch or other device) may be developed with a feature so as to support 202 a new SNMP trap. However, the network management software does not know 204 how to process the new trap.

Figure 1:
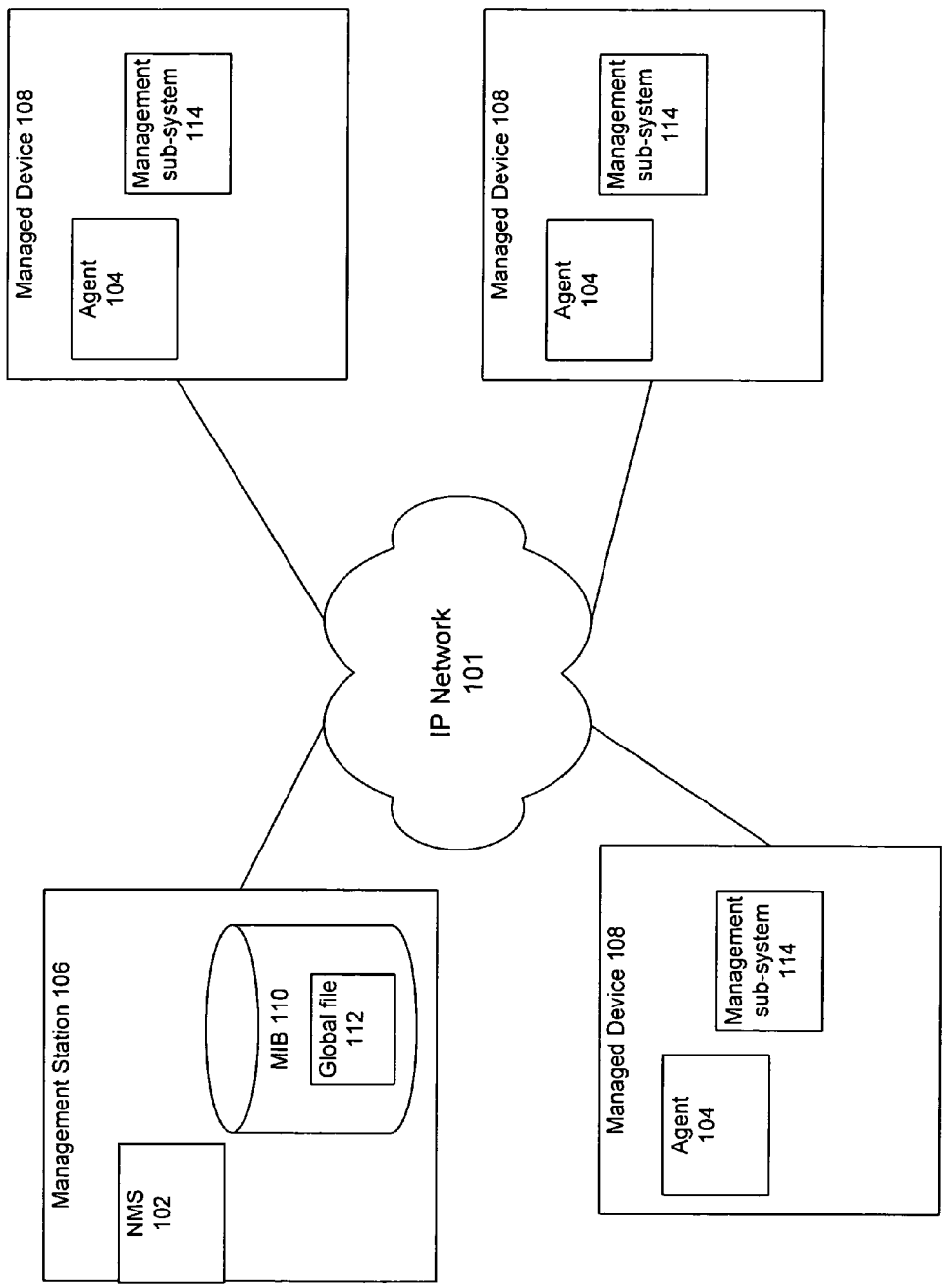
FIG. 1 is a schematic diagram depicting a conventional SNMP managed network.
Figure 2:
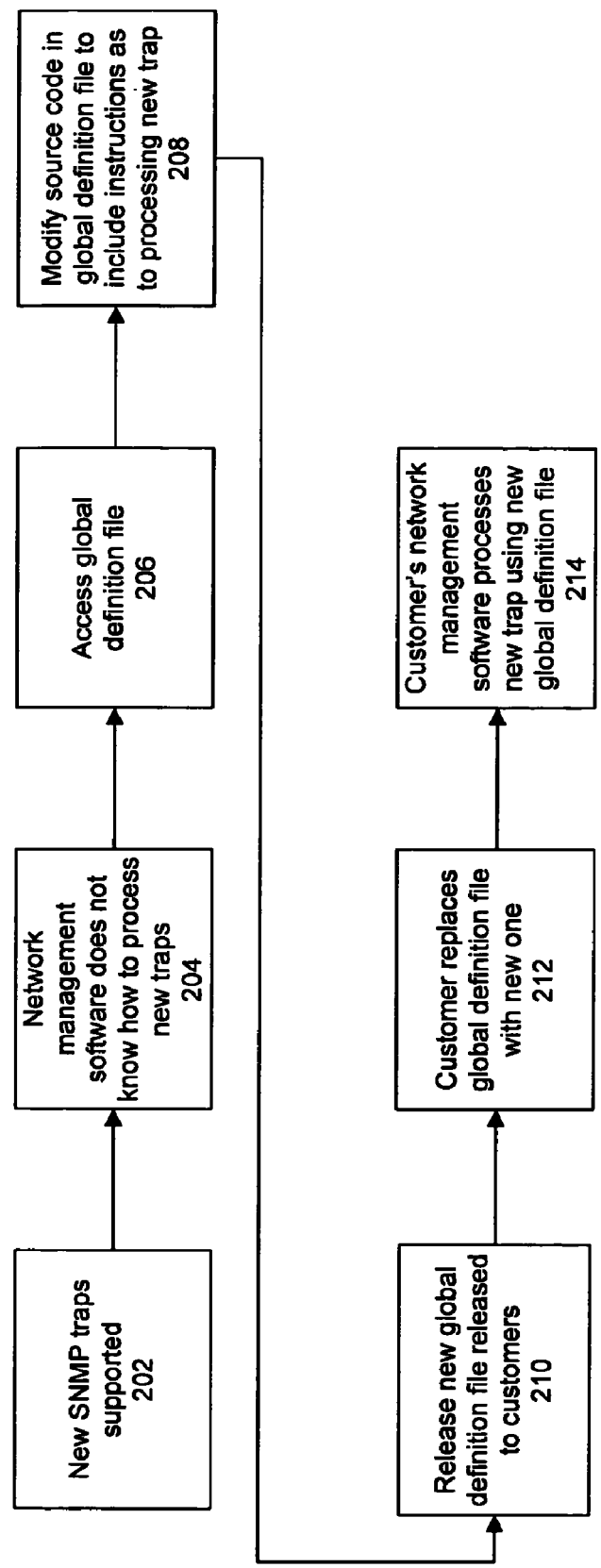
FIG. 2 is a flow chart depicting a conventional method of providing for new traps in an SNMP system.

Unlike in the conventional method 200 of FIG. 2, no global trap definition file is replaced 212. Instead, a new specific trap definition file 304 is created 208. The specific trap definition file 304 may be created 208, for example, by a technical person at a service provider. The individual trap definition file 304 may then be posted 404 on the web, such that a customer may download 406 the file from the web. In other implementations, other file distribution techniques may be used.

The customer puts 408 the new trap definition file 304 into the trap definition folder 302 (or other location known by the network management software). The new trap definition file 304 may be called a "drop in file" because it advantageously may be simply "dropped into" a trap definitions folder 302. Thereafter, the customer's network management software may process 410 traps defined by the new trap definition file.

Figure 5:
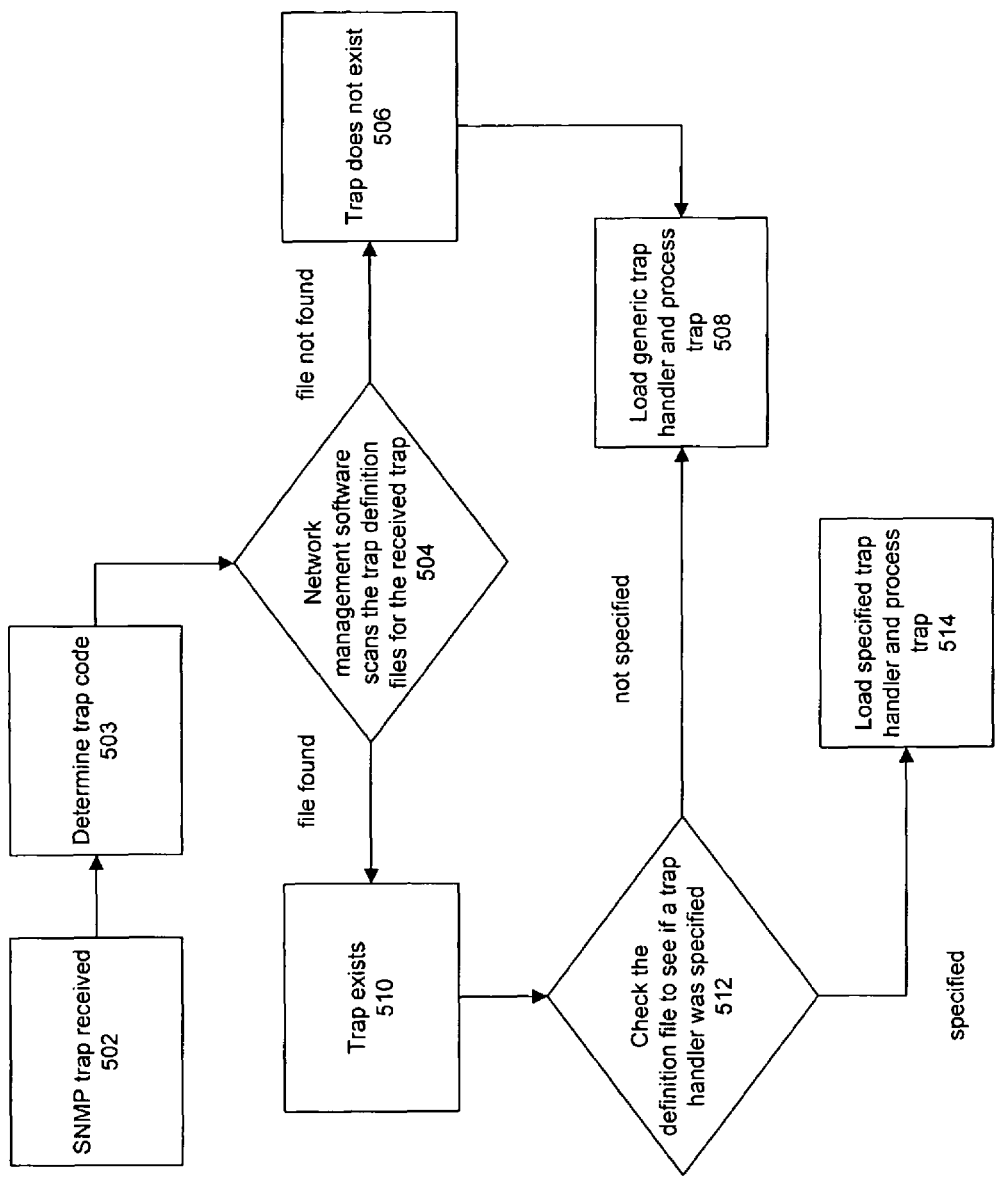
FIG. 5 is a flow chart depicting a method of processing traps with dynamic trap definition files in accordance with an embodiment of the invention.

FIG. 5 is a flow chart depicting a method 500 of processing 410 traps received in accordance with an embodiment of the invention. When an SNMP trap is received 502 from an agent 104 by an NMS 102, the network management software determines 503 the trap code and scans 504 the trap definition files 304 in the trap definitions folder 302 for a file with the same trap code and so corresponding to the received trap. If a corresponding file is not found, then the trap received does not exist 506 in the set of specifically defined traps. As such, a generic trap handler is loaded and used to process the trap 508.

If a corresponding file is found in the trap definitions folder 302, then the trap received does exist 510 in the set of specifically defined traps. The corresponding trap definition file 304 is then checked 512 to see if the definition therein specifies a particular trap handler. If so, then the specified trap handler is loaded and used to process the trap 514.

The prior conventional solution disadvantageously involves "hard coding" the processing of incoming traps by changing the source code in the global definition file. The prior solution is disadvantageous because in order to increase the functionality of the network management system, an engineer must revise the source code and release the new version to the public. Hence, the prior solution is not very scalable.

In contrast, scalability is more easily achieved in accordance with an embodiment of the invention because functionality may be increased by simply dropping in an additional (auxiliary) file into a folder. No actual source code of the base application needs to be revised. Hence, adding functionality to the network management system becomes advantageously user configurable. Users may advantageously create their own trap definition files, without the software provider having to change the base code.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of updating trap definitions and processing an event trap by network management software, the method comprising:
    downloading a new trap definition file from a website;
    placing the new trap definition file in a trap definitions folder, said trap definitions folder storing a plurality of trap definition files, each trap definition file providing information relating to a specific trap event;
    receiving the trap;
    determining a trap code of the received trap;
    scanning said trap definition files in said trap definitions folder for a corresponding trap definition file having the trap code of the received trap; and
    wherein the receiving, determining, and scanning are performed by at least one hardware processor executing the network management software.

2. The method of claim 1, further comprising:
    if the corresponding trap definition file is not found in the trap definitions folder, then loading a generic trap handler and processing the received trap with the generic trap handler.

3. The method of claim 1, further comprising:
    if the corresponding trap definition file is found in the trap definitions folder, then checking the found file to see if a trap handler is specified therein.

4. The method of claim 3, further comprising:
    if the trap handler is specified, then loading the specified trap handler and processing the received trap with the specified trap handler.

5. The method of claim 4, further comprising:
    if the trap handler is not specified, then loading a generic trap handler and processing the received trap with the generic trap handler.

6. An apparatus for updating trap definitions and processing an event trap, apparatus comprising:
    a data storage system including a non-transitory computer readable medium configured to store computer-readable code and data;
    a processor configured to access the data storage system and to execute the stored computer-readable code;
    a trap definitions folder in the data storage system which is accessible to the network management system and which stores a plurality of trap definition files;
    computer-readable code stored in the non-transitory computer readable medium of the data storage system which is configured to provide a website providing access to new trap definition files, such that the new trap definitions files are downloadable into the trap definitions folder;
    computer-readable code stored in the non-transitory computer readable medium of the data storage system which is configured to receive the trap; and
    computer-readable code stored in the non-transitory computer readable medium of the data storage system which is configured to scan trap definition files in said trap definitions folder for a trap definition file corresponding to the received trap and select and load a trap handler based on a result of said scan.

7. The apparatus of claim 6, further comprising computer-readable code stored in the non-transitory computer readable medium of the data storage system which is configured such that, if the corresponding trap definition file is not found in the trap definitions folder, then a generic trap handler is loaded, and the received trap is processed with the generic trap handler.

8. The apparatus of claim 6, further comprising computer-readable code stored in the non-transitory computer readable medium of the data storage system which is configured such that, if the corresponding trap definition file is found in the trap definitions folder, then the found file is checked to see if a trap handler is specified therein.

9. The apparatus of claim 8, further comprising computer-readable code stored in the non-transitory computer readable medium of the data storage system which is configured such that, if the trap handler is specified, then the specified trap handler is loaded, and the received trap is processed with the specified trap handler.

10. The apparatus of claim 9, further comprising computer-readable code stored in the non-transitory computer readable medium of the data storage system which is configured such that, if the trap handler is not specified, then a generic trap handler is loaded, and the received trap is processed with the generic trap handler.

11. A process of configuring a network management system to support a new event trap, the process comprising:
dropping a new trap definition file into a trap definitions folder that is known to the network management system, wherein the trap definitions folder includes multiple trap definition files; and
configuring the network management system such that, when a trap is received, the multiple trap definition files in the folder are scanned by the network management system in order to find a file corresponding to the received trap.

12. The process of claim 11, further comprising:
posting the new trap definition file on a web site; and
a user downloading the new trap definition file from the web site.

13. A computer apparatus configured as a management station of a network management system, the apparatus comprising:
a data storage device including a non-transitory computer readable medium configured to store computer-readable instructions and data;
a processor configured to execute the stored computer-readable instructions;
computer-readable code stored in the non-transitory computer readable medium and configured to implement a network management system;
a management information base configured in the non-transitory computer readable medium of the data storage device and utilized by the network management system; and
a trap definitions folder configured in the non-transitory computer readable medium of the data storage device having a plurality of trap definition files therein; and
computer-readable code stored in the non-transitory computer readable medium which is configured such that, when a trap is received, the multiple trap definition files in the folder are scanned in order to find a file corresponding to the received trap and a trap handler is loaded by said processor in response to a result of scanning of said multiple trap definition files for a file corresponding to the received trap.

14. The method of claim 1, wherein placing the new trap definition file in the trap definitions folder comprises dropping the new trap definition file in the trap definitions folder.

15. The apparatus of claim 6, wherein the computer-readable code stored in the non-transitory computer readable medium of the data storage system is configured to receive a new trap definition file that is dropped into the trap definitions folder.

16. The apparatus of claim 13, wherein said trap definitions folder is configured to receive a new trap definition file that is dropped into the trap definitions folder.

17. The process of claim 11, further comprising:
if a corresponding trap definition file is not found in the trap definitions folder, then loading a generic trap handler and processing the received trap with the generic trap handler.

18. The process of claim 11, further comprising:
if a corresponding trap definition file is found in the trap definitions folder, then checking the found file to see if a trap handler is specified therein.

19. The process of claim 18, further comprising:
if the trap handler is specified, then loading the specified trap handler and processing the received trap with the specified trap handler.

20. The process of claim 18, further comprising:
if the trap handler is not specified, then loading a generic trap handler and processing the received trap with the generic trap handler.

* * * * *